United States Patent
Varma et al.

(10) Patent No.: US 10,936,395 B1
(45) Date of Patent: Mar. 2, 2021

(54) SMART LOG PARSER FOR BACKUP SOFTWARE TO EASE TROUBLESHOOTING

(71) Applicant: EMC IP Holding Company LLC, Hopkinton, MA (US)

(72) Inventors: Preeti Varma, Karnataka (IN); Syed Hassan, Bangalore (IN); Pravin Ratnakar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 114 days.

(21) Appl. No.: 15/714,903

(22) Filed: Sep. 25, 2017

(51) Int. Cl.
*G06F 11/07* (2006.01)
*G06F 11/14* (2006.01)
*G06F 16/14* (2019.01)

(52) U.S. Cl.
CPC ...... *G06F 11/0766* (2013.01); *G06F 11/0727* (2013.01); *G06F 11/1464* (2013.01); *G06F 16/148* (2019.01); *G06F 2201/80* (2013.01)

(58) Field of Classification Search
CPC .. G06F 11/07; G06F 11/0766; G06F 11/0727; G06F 11/14; G06F 11/1464
USPC .......................................................... 714/37
See application file for complete search history.

(56) References Cited

U.S. PATENT DOCUMENTS

| | | | | |
|---|---|---|---|---|
| 7,673,340 | B1* | 3/2010 | Cohen | G06F 11/3438 |
| | | | | 379/266.08 |
| 9,773,006 | B1* | 9/2017 | Reker | G06F 11/1446 |
| 10,146,629 | B1* | 12/2018 | Yadav | G06F 11/1451 |
| 2011/0113287 | A1* | 5/2011 | Gururaj | G06F 11/0766 |
| | | | | 714/37 |
| 2014/0025995 | A1* | 1/2014 | Narayanan | G06F 11/0706 |
| | | | | 714/37 |

* cited by examiner

*Primary Examiner* — Kamini B Patel
(74) *Attorney, Agent, or Firm* — Workman Nydegger

(57) ABSTRACT

In one example, a method can be performed that involves receiving user input concerning a failure of a data protection job, and performing various operations automatically without requiring further user input or action. Such operations include querying a database, based on the user input, to identify a log file, accessing the log file and extracting information from the log file based on the user input, using information extracted from the log file to identify a potential cause of the failure, and generating a report that lists the potential cause of the failure.

20 Claims, 4 Drawing Sheets

SMART LOG PARSER FOR BACKUP SOFTWARE TO EASE TROUBLESHOOTING

FIELD OF THE INVENTION

Example embodiments of the invention relate to systems and methods for managing data. More particularly, at least some embodiments of the invention relate to systems and methods for identifying a root cause of a backup failure.

BACKGROUND

Entities typically generate and use data that is important in some way to their operations. This data can include, for example, business data, financial data, and personnel data. Accordingly, entities create and store backups of their important data that can later be used in a data restore process if necessary. Creation and storage of backups is performed with a backup application.

While backup applications generally provide acceptable performance, problems nonetheless occur during some backup processes. Thus, it is important to be able to determine the root cause of the problem so that the problem can be resolved, and the backup performed. One technological problem that commonly arises is that the customer must first identify which client backup/restore process has failed.

Thus, a related problem that is presented in these types of situations concerns the fact that there are multiple possible failure points and, as such, a variety of different logs may be employed to collect information at the various possible failure points. The use of multiple logs introduces a variety of additional technological problems however. For example, a further technological problem is that if a backup should fail, the customer typically has to manually examine multiple logs in an attempt to identify the source and cause of the problem. This examination of the logs may or may not be adequate to provide this information.

As well, the customer must have an awareness of where the different logging of a backup/restore is taking place. However, due to the multiplicity of logs, and other problems, this is not always readily ascertained. Moreover, even if the logging points can be determined, the customer may also have to perform processes such as time stamp matching, and possibly also rendering and analyzing the logs, in an attempt to identify a possible solution to the problem.

The customer may attempt to reduce the number of logs needed to be examined by manually shortlisting the list of logs that correspond to the problem that has occurred. Again however, shortlisting requires the customer to identify a complete list of the logs and then analyze the logs to see which particular ones may be of interest. For example, the customer may have to manually render and read through the entire group of backup server side logs and the entire group of client side logs.

Another approach to identifying the possible cause of a backup failure is to map the logs to the particular time stamp when the problem occurred. However, this approach is problematic in that it requires an inspection of all of the time stamps in all of the logs and, as such, is typically a time consuming process.

As is apparent, many of the approaches to problem identification in the context of a backup failure involve a significant amount of manual work on the part of the customer or administrator. As such, there is a strong likelihood of human induced error occurring at one or more points during the troubleshooting process. These human errors prolong and complicate troubleshooting. As well, manual processes are typically slow and as a result, identification and resolution of backup and restore problems may not occur in a timely manner.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
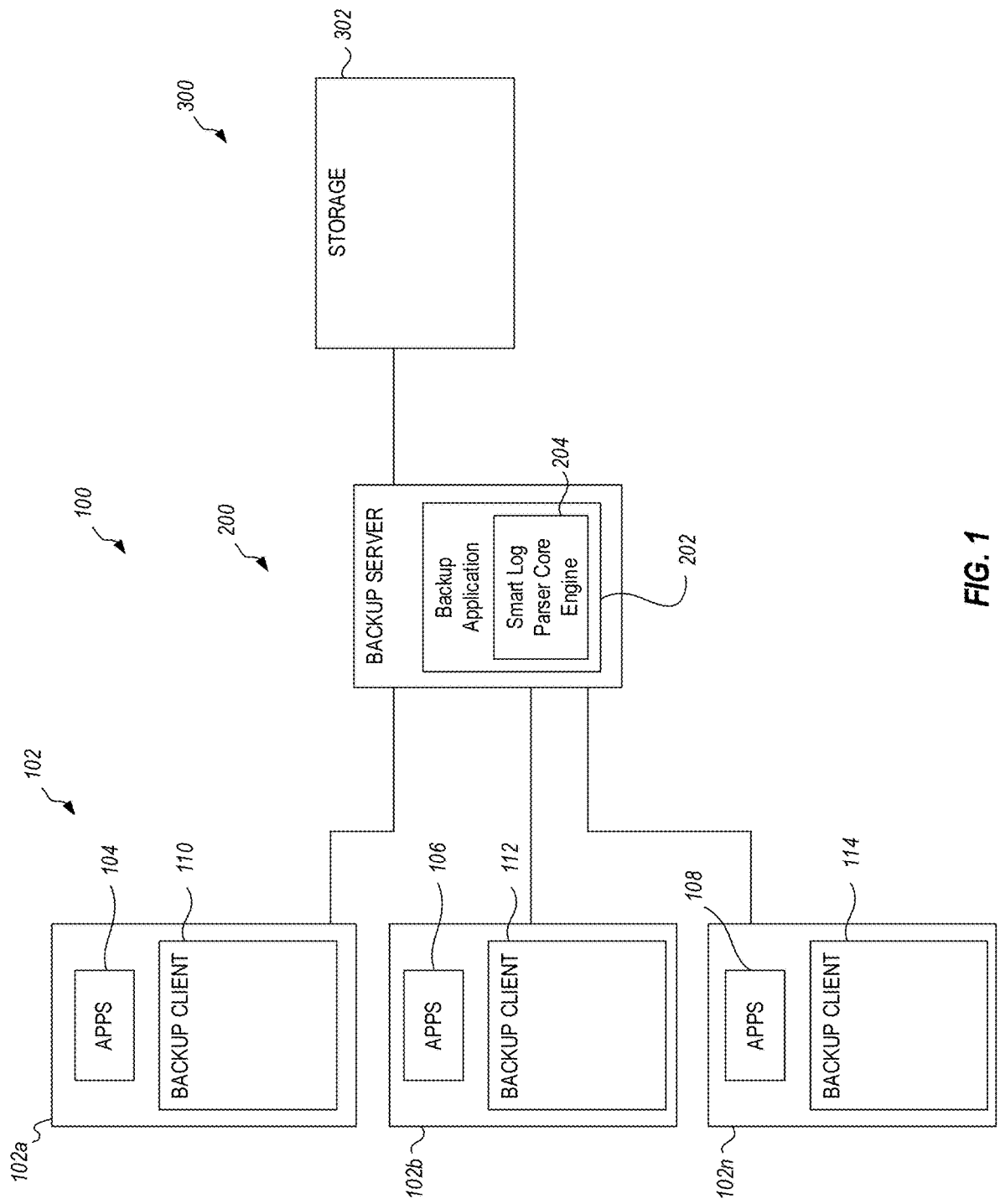
FIG. 1 illustrates an example of an operating environment in which various data protection and troubleshooting operations may be performed.

Example embodiments of the invention generally relate to systems and methods for managing data. More particularly, at least some embodiments of the invention concern systems, hardware, software, computer-readable media, and methods directed to parsing logs and identifying root causes of failures in backup and restore processes.

In light of the technological problems noted herein, and others, what is needed are ways to improve troubleshooting processes so as to make the troubleshooting processes simpler, faster, and less prone to error. It would also be useful to incorporate log parsing functionality into backup and restore applications.

Thus, at least some embodiments of the invention may solve one or more of the technological problems noted herein by providing simplified processes for troubleshooting, including evaluation of logs and log content, as well as enabling a user to enter queries and other information to facilitate the troubleshooting process. As such, embodiments of the invention represent a significant technological advance, both in terms of speed and functionality, relative to conventional logging and troubleshooting processes.

For example, at least some particular embodiments of the invention provide for a log parser that may operate in conjunction with a backup application, a restore application, and/or a backup and restore application. The log parser may implement a workflow implemented in the form of a wizard that enables a focused approach to troubleshooting. The wizard may field user queries/input in various areas, such as clients, policies/groups, backup/restore and/or other jobs, and timestamps. With the input provided by the user, the log parser may map user inputs to information contained in a log parser database, and the log parser may then perform an analysis based on the inputs and mapping. The results of the analysis may then be presented by the log parser to the user. The user can then take the appropriate action(s), which may or may not involve further use of the log parser, to correct the problems identified.

When approaches such as those disclosed herein are employed, troubleshooting processes are implemented that are relatively more focused than conventional processes, inasmuch as the disclosed troubleshooting processes may be guided by user queries and input. As well, multiple logs may be quickly evaluated by the log parser, thus achieving significant time savings relative to manual evaluation of logs. Thus, disclosed embodiments enable a user to quickly access detailed and specific troubleshooting information. Consequently, backup and/or restore problems may be more quickly and effectively identified and resolved, with more reliable results, than is possible with conventional processes.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a storage environment which may comprise, or consist of, a storage array. The storage environment can take various forms, including a cloud storage environment, an on-premises storage environment, or a hybrid storage environment that includes public and private elements, although the scope of the invention is not limited to any particular type of storage environment.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as filesystem, document, file, block, or object may be used by way of example, the principles of the disclosure are not limited to any particular form of representing, organizing, or storing, data or other information. Rather, such principles are equally applicable to any object capable of representing information.

With reference now to FIG. 1, details are provided concerning aspects of an operating environment for at least some embodiments of the invention, one example of which is denoted generally at 100. In general, various backup and restore operations, among others, can be performed in the operating environment 100. Such operations may include, for example, initiating a backup, generating backup streams, performing a backup, storing a backup, or restoring a backup. Any of such operations can be performed in connection with log parsing processes, and related processes, such as are disclosed herein.

The operating environment 100 may include any number of clients 102, such as clients 102a, 102b . . . 102n, that each host one or more applications 104, 106 or 108. In general, the applications 104, 106 and 108 are not limited to any particular functionality or type of functionality, and in connection with their operation, the applications 104, 106 and 108 generate new and modified data that is desired to be backed up. Example applications include, but are not limited to, email applications, word processing applications, database applications, filesystems, CAD applications, audio applications, video applications, and datastores. Each of the clients 102 additionally includes a backup client 110, 112 or 114 that cooperates with a backup application, discussed below, to create backups of data stored locally at the clients 102. The backup clients 110, 112 and 114 may also cooperate with a backup application to restore stored data to one or more of the clients 102.

As further indicated in FIG. 1, the operating environment 100 includes a backup server 200 that includes a backup application 202. The backup application 202 cooperates with the backup agents 110, 112 and 114 to create backups of data generated by the applications 104, 106 and 108, and stored at the clients 102a, 102b, and 102n. In some embodiments, the backup server 200 comprises a Dell-EMC Avamar server, or a Dell-EMC Networker server, although neither of those particular implementations is required for any embodiment. The backup server 200 also includes a smart log parser (SLP) core engine 204 which may be an element of the backup application 202, or the SLP core engine 204 may be separate from the backup application 202.

When the backups have been created, the backup server 200 communicates with a storage array 300 to store the backups. In some example embodiments, the storage array 300 can comprise, or consist of, the Dell-EMC Data Domain environment, a global storage area network (GSAN), or storage area network (SAN). None of these particular implementations is required however. In the illustrated example, the storage array 300, which can be, for example, a cloud datacenter, on-premises storage, or any other type of storage system or configuration or combination thereof, includes storage 302. Backups stored in the storage array 300 can be recovered by the backup application 202 and restored to a host 102.

B. Example Host Configuration

Figure 2:
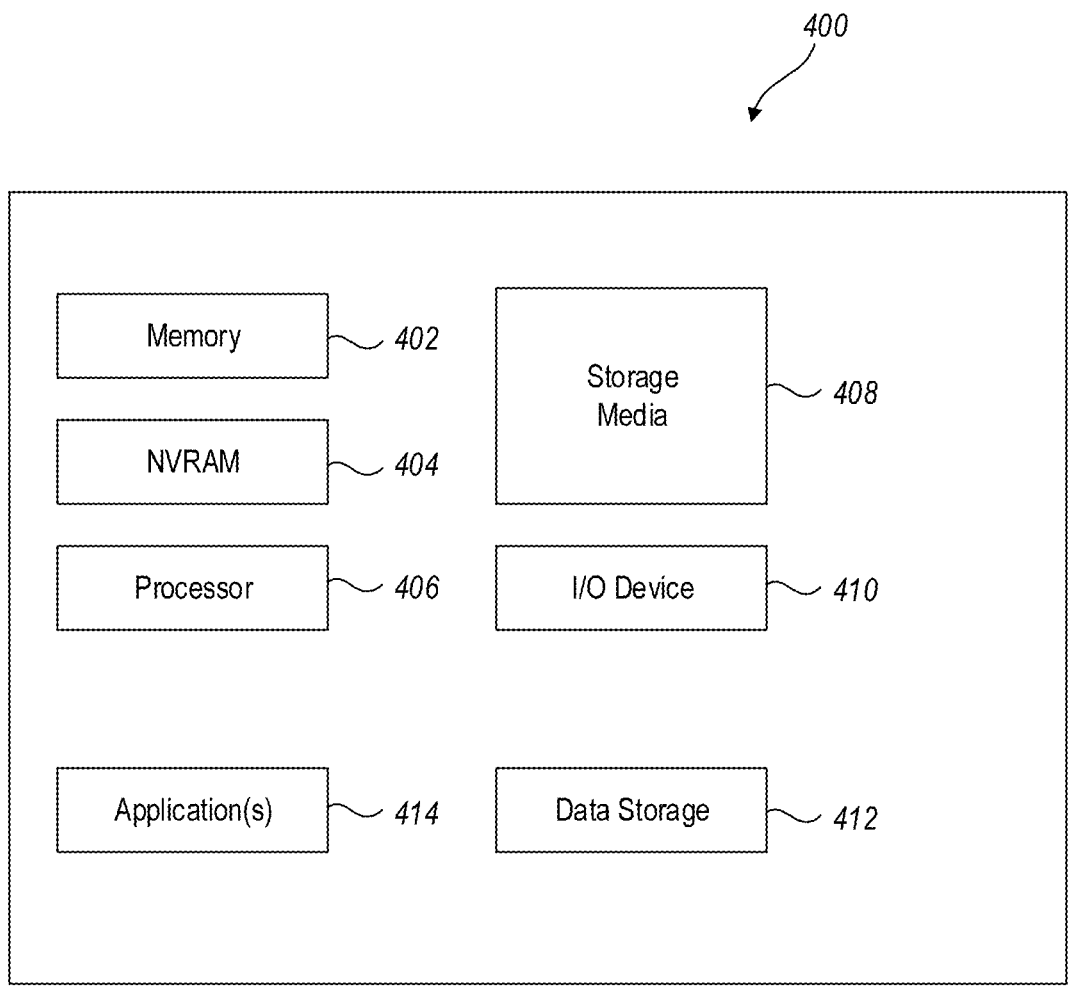
FIG. 2 discloses aspects of an example physical computing device configuration.

Turning briefly now to FIG. 2, any one or more of the clients 102, backup server 200, and storage 302 can take the form of a physical computing device, one example of which is denoted at 400. In the example of FIG. 2, the physical computing device 400, which may be a host, includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take various forms including, for example, a backup client application, a restore client application, a backup application, a restore application, a backup and restore application, a rules engine, and an SLP core engine.

C. Smart Log Parser (SLP) Core Engine

Figure 3A:
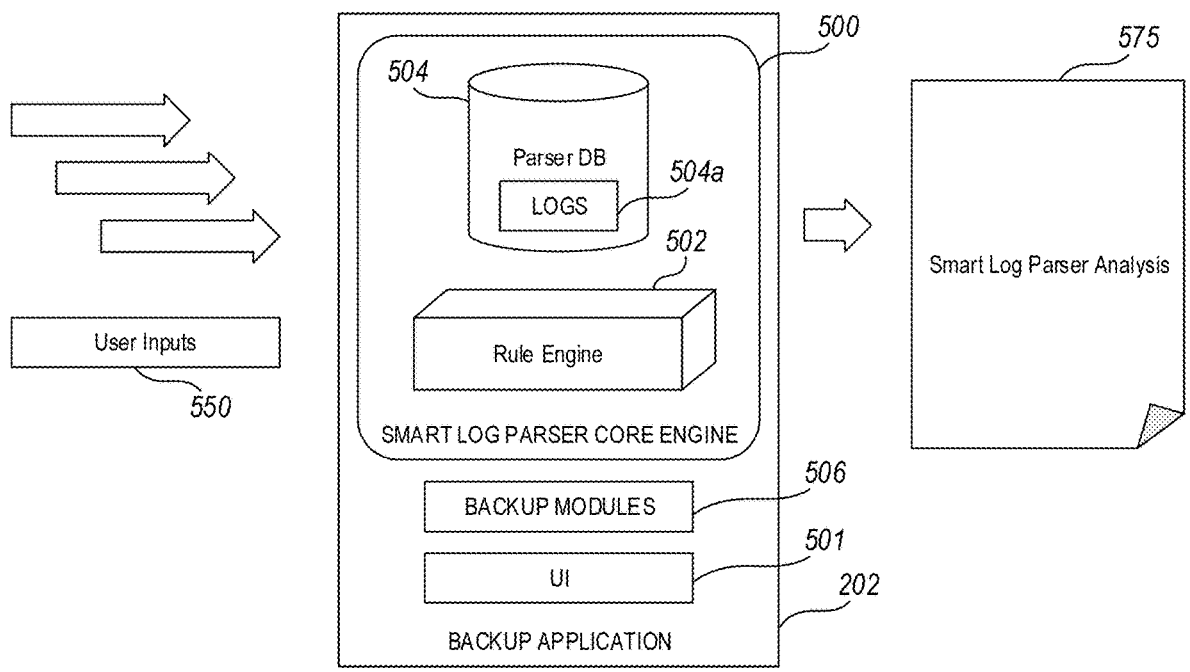
FIGS. 3a and 3b disclose aspects of an example backup application configuration.
Figure 3B:
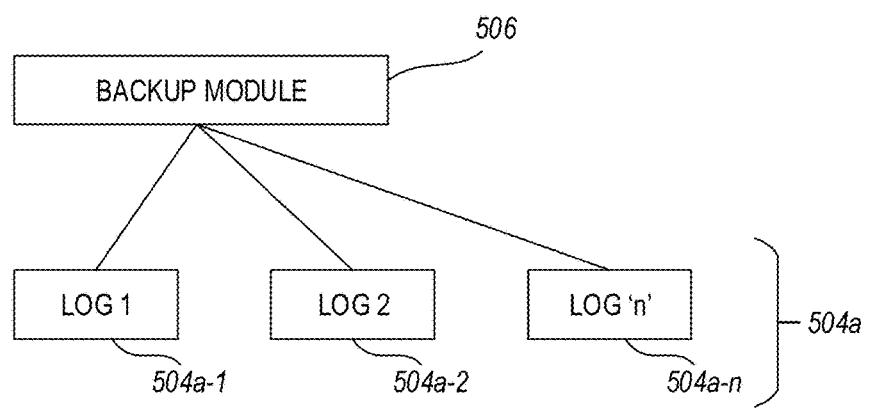

With reference next to FIGS. 3a and 3b, details are provided concerning an example architecture for an SLP. As indicated, an SLP core engine 500 may be provided that is part of a backup application, such as the example backup application 202. In general, the SLP core engine 500 is operable to create a document and/or other output which has all the collated information about the failure of an event.

More particularly, a user can provide one or more user inputs 550, such as by way of a graphical user interface (GUI), command line interface (CLI), or any other type of user interface (UI) 501, to the backup application 202. The user input 550 may be entered by way of the UI in response to yes/no questions, menu choices, dialog boxes, and/or other mechanisms or input fields presented to the user by a wizard or expert system. The UI may reside at, or otherwise be associated with, the backup server 200. In some embodiments, and as indicated in FIG. 3a, the UI 501 is presented by the backup application 202, although that is not necessarily required.

Example user inputs 550 may include, but are not limited to, queries and/or other information concerning clients, policies and groups, backup/restore jobs or other jobs, and timestamps. More generally, any user input 550 that relates to a backup and/or restore operation can be employed in embodiments of the invention. Based on the user input 550, the SLP core engine 500 generates and outputs a corresponding SLP analysis 575. Further details concerning the operation of the SLP core engine 500 are provided in the following discussion.

With continued reference to FIGS. 3a and 3b, the example SLP core engine 500 of the backup application 200 includes a rules engine 502 and a parser database (DB) 504. The rules engine 502 and parser database 504 are configured to communicate with each other, and the rules engine 502 may also communicate with one or more of the clients 102.

Among other things, the parser database 504 facilitates the mapping of each backup application module 506 to the corresponding log(s) 504a, such as logs 504a-1 . . . 504a-n. In general, the example backup application 202 may include a respective module 506 for each type of backup expected to be performed by the backup application. As such, the backup application 202 may comprise multiple modules. During a backup operation, the backup module 506 maps information about the backup to one or more logs 504a that reside at the parser database 504. Thus, for example, if a Block Based Backup (BBB), such as may be performed in connection with the Dell-EMC NetWorker backup application, is the subject of a troubleshooting process, the parser database 504 will have user accessible information about the backup that shows a mapping relation, as shown in FIG. 3b, between the BBB module 506 and any logs 504a which relate to the BBB module. Such logs may include, in the example case of a BBB module, daemon.raw log, message logs, policy logs, savegroup logs, and nsrbbb.raw logs. Of course, the scope of the invention is not limited to any particular type(s) of backup, nor to any particular log(s). Thus, reference to a BBB and associated logs is solely for the purpose of illustration.

To continue with the BBB example, the logs 504a-1 . . . 504a-n can then be examined as part of a troubleshooting process, such as may be performed when a failure or other problem has occurred that involves the BBB. That is, the SLP core engine 500, particularly the rules engine 502, will read through the problematic portion of logs 504a related to the BBB.

In at least some embodiments, the user input 550 may include information that serves to limit or define the scope of information that should be reviewed and analyzed by the rules engine 502. More generally that is, the user may define one or more parameters that collectively guide the troubleshooting process. For example, the user input 550 may include a list of user-specified logs that are to be evaluated. The list may include one, some, or all, of the logs associated with a particular backup module.

As another example, the user input 550 may additionally, or alternatively, specify a time stamp, or multiple time stamps that define a particular time frame. The time stamp information 550 can be used by the rules engine 502 to confine the examination of one or more logs 504a to a particular time frame. That is, a user can specify that only the logged events falling within a specified time frame should be examined. For example, the user may specify that only logged events that occurred before, or after, a particular time T1 should be examined. As another example, the user may specify that only logged events occurring in the timeframe defined by T2 . . . T4 should be examined. Thus, logged events occurring before T2 and after T4 are not reviewed by the rules engine 502. Because the entire log need not be reviewed, the troubleshooting process may be performed relatively more quickly than would otherwise be the case. This is particularly advantageous in circumstances where multiple logs may have to be examined. In this way, a user can control and define the scope and, thus, the speed of a troubleshooting process.

With continued reference to FIGS. 3a and 3b, the rules engine 502 may map, or otherwise correlate or associate, the user inputs 550 to information in the parser database 504 so that the appropriate data can be gathered by the rules engine 502 from the parser database 504, that is, the data that is responsive, and/or otherwise relates, to the user input 550. After the rules engine 502 has gathered the data pertaining to the user input, the rules engine 502 can then analyze the user input and log information, and generate an analysis report based on the user input and log information. The report can then be presented by the rules engine 502 to the user. Among other things, the analysis report may include all the potential errors that were logged in multiple logs for a specific module for the problematic job.

With the information and results contained in the analysis report, the user may then take, or cause the performance of, whatever corrective action(s) may be necessary to resolve the identified problem(s). After any corrective action(s) have been taken, the job in connection with which the problem(s) arose can then be rerun.

D. Aspects of Some Example Methods

Figure 4:
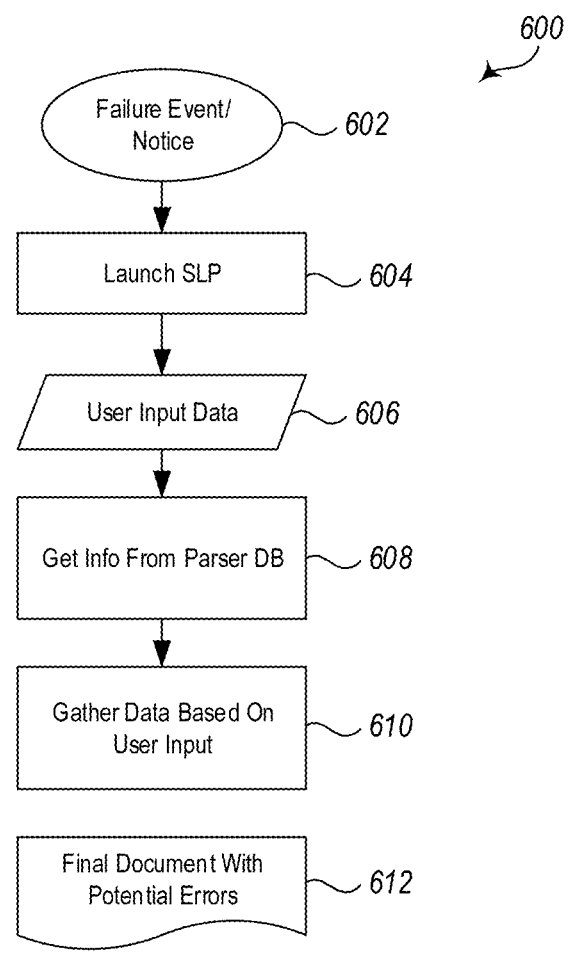
FIG. 4 is a flow diagram illustrating aspects of an example method for troubleshooting of a data protection operation.

With attention now to FIG. 4, details are provided concerning some example methods for troubleshooting the failure of a backup, restore, or clone process, where one example of such a method is denoted generally at 600. As used herein, a cloning process refers to a process in which one or more copies, or clones, are made of backed up data. The clones may be stored in a different location than the backup itself. The method 600 can be performed in an operating environment such as the example operating environment 100 in FIG. 1, although no particular operating environment is necessarily required. In some embodiments at least, part or all of the method 600 can be performed by a backup application, and in some particular embodiments, by an SLP core engine of a backup application.

The example method 600 can begin as a result of the occurrence of a failure event 602. Example failure events include, but are not limited to, the failure of a backup job, the failure of a recover job, the failure of a restore job, and the failure of a clone job. Failure events can more generally include the failure of any event concerning a process that is related to data protection. In connection with the occurrence of a failure event 602, a notification such as an error message may be automatically generated and transmitted, or otherwise made available, to a recipient, such as an administrator or other user. In some alternative embodiments, a notification is not automatically transmitted.

At some point after the failure has occurred, the SLP is launched 604. The SLP launch 604 may be instantiated by a user, such as by way of a UI of a backup server for example. The user may launch the SLP 604 after having received a notification that a problem has occurred, or the user may launch the SLP 604 so as to make a determination as to whether or not a failure has occurred, as discussed below. Launching of the SLP 604 may include presenting, such as by way of a UI, the user with a wizard or expert system by way of which the user can enter input data 606. Information entered by the user 606 can be any information relating to a failure that has occurred, and which the SLP can use to obtain particular information concerning that failure. Such information may include, but is not limited to, the time of the failure, and the node where the failure occurred.

In some circumstances, the user may not be aware that a failure has occurred, and may want to make a determination in that regard. In these cases, the user can enter information 606 and query the SLP to find out if a failure has occurred. Thus, the SLP collects the data from the user for identifying area of failure and if the user is not aware of a failure, then the SLP may present the user with a list of the failed jobs, along with information concerning those failed jobs.

After the user has provided input 606 to the SLP, and one or more failed jobs have been identified, the SLP may then query the DB 608, based on the user input, to identify which log file(s) should be reviewed and analyzed. Using the results of the query 608, the SLP will access each log file and render 610 the log, match, and filter based on the timestamp and/or other user input parameters, so as to identify, by application of one or more rules of the rules engine, the potential errors or causes of the failure.

Finally, the log information gathered by the SLP may be assembled 612 to produce a report, such as a document or other type of file, including details concerning potential errors or causes of the failure. The report can then be made accessible to the user.

Because the scope and type of information gathered from the logs by the SLP may be based in whole or in part on the user input 606, and thus may be relatively narrow, the report may contain only the material and information that is most relevant in identifying the cause of the failure. That is, the information and material in the report reflect a filtering process, based on user input, that eliminates extraneous or irrelevant information from the report. Thus, for example, even if the report identifies several possible failure mechanisms, it may still be relatively quicker and easier for a user to determine the cause of the problem than if the material and information had not been filtered first. Using the information in the report, the user can then take whatever action(s) may be needed to determine the cause of the error, and then resolve the problem.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    mapping a backup application module to a plurality of log files stored in a database, wherein the database stores log files for each of multiple modules of the backup application;
    receiving input concerning a failure of a data protection job associated with the backup application module, wherein the user input includes first user input that identifies the failed data protection job and second user input; and
    performing the following operations automatically without requiring further user input or action:
    querying a database with a query, based on the first user input, to identify a log file from the plurality of log files mapped to the backup application module and associated with the data application module;
    accessing the log file and extracting information from the identified log file based on the second user input, wherein the second user input defines a scope of the identified log file to be reviewed;
    reviewing the log file in accordance with the second user input;
    extracting information from the identified log file based on the second user input; and
    generating a report that lists the potential cause of the failure, wherein the second user input acts as a filter when extracting information to eliminate extraneous information from the report.

2. The method as recited in claim 1, wherein the method is performed by a smart log parser core engine of the backup application.

3. The method as recited in claim 1, wherein the data protection job is one of: a backup operation; a restore operation; a recover operation; or, a clone operation.

4. The method as recited in claim 1, wherein the information extracted from the log file is associated with one or more particular timestamps specified in the user input.

5. The method as recited in claim 1, wherein accessing a log file comprises accessing only a log file that includes information about the failure.

6. The method as recited in claim 1, wherein receiving user input comprises receiving user input that comprises one or more timestamps and/or an identity of a failure node.

7. The method as recited in claim 1, wherein receiving user input comprises receiving a user query as to whether or not a failure has occurred.

8. The method as recited in claim 1, wherein the identified log file is associated with a specific backup module of the backup application.

9. The method as recited in claim 1, wherein the data protection job is a block based data protection job.

10. The method as recited in claim 1, wherein a portion of a user input workflow is implemented in the form of a wizard.

11. A non-transitory storage medium having stored therein computer-executable instructions which, when executed by one or more hardware processors, perform the operations:
    mapping a backup application module to a plurality of log files stored in a database, wherein the database stores log files for each of multiple modules of the backup application;
    receiving user input concerning a failure of a data protection job associated with the backup application module, wherein the user input includes first user input that identifies the failed data protection job and second user input; and
    performing the following operations automatically without requiring further user input or action:
    querying a database with a query, based on the first user input, to identify a log file from the plurality of log files mapped to the backup application module and associated with the data application module;
    accessing the log file and extracting information from the identified log file based on the second user input, wherein the second user input defines a scope of the identified log file to be reviewed;
    reviewing the log file in accordance with the second user input;
    extracting information from the identified log file base on the second user input; and
    generating a report that lists the potential cause of the failure, wherein the second user input acts as a filter when extracting information to eliminate extraneous information from the report.

12. The non-transitory storage medium as recited in claim 11, wherein the method is performed by a smart log parser core engine of the backup application.

13. The non-transitory storage medium as recited in claim 11, wherein the data protection job is one of: a backup operation; a restore operation; a recover operation; or, a clone operation.

14. The non-transitory storage medium as recited in claim 11, wherein the information extracted from the log file is associated with one or more particular timestamps specified in the user input.

15. The non-transitory storage medium as recited in claim 11, wherein accessing a log file comprises accessing only a log file that includes information about the failure.

16. The non-transitory storage medium as recited in claim 11, wherein receiving user input comprises one of: receiving user input that comprises one or more timestamps and/or an identity of a failure node; or, receiving a user query as to whether or not a failure has occurred.

17. The non-transitory storage medium as recited in claim 11, wherein the identified log file is associated with a specific backup module of the backup application.

18. The non-transitory storage medium as recited in claim 11, wherein the data protection job is a block based data protection job.

19. The method as recited in claim 1, wherein a portion of a user input workflow is implemented in the form of a wizard.

20. A server comprising:
    one or more hardware processors; and
    the non-transitory storage medium as recited in claim 11.

* * * * *